United States Patent
Luipold et al.

(10) Patent No.: US 9,145,927 B2
(45) Date of Patent: Sep. 29, 2015

(54) ONE-WAY CLUTCH CARRIER ASSEMBLY WITH BEARING

(71) Applicant: Schaeffler Technologies GmbH & Co. KG, Herzogenaurach (DE)

(72) Inventors: Chris Luipold, Wadsworth, OH (US); Marion Jack Ince, Mount Holly, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/285,899

(22) Filed: May 23, 2014

(65) Prior Publication Data

US 2014/0353110 A1 Dec. 4, 2014

Related U.S. Application Data

(60) Provisional application No. 61/828,511, filed on May 29, 2013.

(51) Int. Cl.
*F16D 47/04* (2006.01)
*F16D 13/58* (2006.01)

(52) U.S. Cl.
CPC ............... *F16D 13/58* (2013.01); *F16D 47/04* (2013.01)

(58) Field of Classification Search
USPC ................................. 192/45.008, 41 R, 48.3
See application file for complete search history.

(56) References Cited

U.S. PATENT DOCUMENTS

| | | | |
|---|---|---|---|
| 3,251,442 A * | 5/1966 | Aschauer | 192/48.3 |
| 3,476,226 A * | 11/1969 | Massey | 192/27 |
| 5,601,166 A | 2/1997 | Beppu et al. | |
| 5,638,931 A * | 6/1997 | Kerr | 192/45.005 |
| 6,024,197 A * | 2/2000 | Suwa et al. | 192/48.92 |
| 6,343,681 B1 | 2/2002 | Aoki | |
| 6,481,548 B2 * | 11/2002 | Monahan et al. | 192/38 |
| 7,406,768 B2 | 8/2008 | Ikeda et al. | |
| 8,397,888 B2 * | 3/2013 | Shirataki et al. | 192/45.016 |
| 8,413,778 B2 * | 4/2013 | Takasu et al. | 192/45.016 |
| 8,485,332 B2 * | 7/2013 | Shirataki et al. | 192/45.016 |
| 2003/0089570 A1* | 5/2003 | Ochab et al. | 192/50 |
| 2007/0267264 A1* | 11/2007 | Pederson | 192/45 |
| 2014/0246286 A1 | 9/2014 | Luipold et al. | |

FOREIGN PATENT DOCUMENTS

| | | | |
|---|---|---|---|
| JP | 05256341 A | 10/1993 | |
| JP | 09014260 A | 1/1997 | |

OTHER PUBLICATIONS

International Search Report for PCT/US2014/039299, mailed Oct. 1, 2014 by Korean Intellectual Property Office.

* cited by examiner

*Primary Examiner* — Rodney H Bonck
*Assistant Examiner* — Lillian Nguyen
(74) *Attorney, Agent, or Firm* — Kathryn A. Warner; Kevin L. Parks

(57) ABSTRACT

A clutch carrier assembly for a transmission includes a clutch carrier, an outer race, a bearing, an inner race, and a one-way clutch. The clutch carrier is arranged for driving engagement with a plurality of clutch plates. The outer race is fixedly connected to the carrier and has an inner circumferential surface. The bearing has an outer circumferential surface aligned with the inner circumferential surface. The inner race is arranged for driving engagement with a transmission shaft. The one-way clutch is disposed radially between the outer race and the inner race.

14 Claims, 7 Drawing Sheets

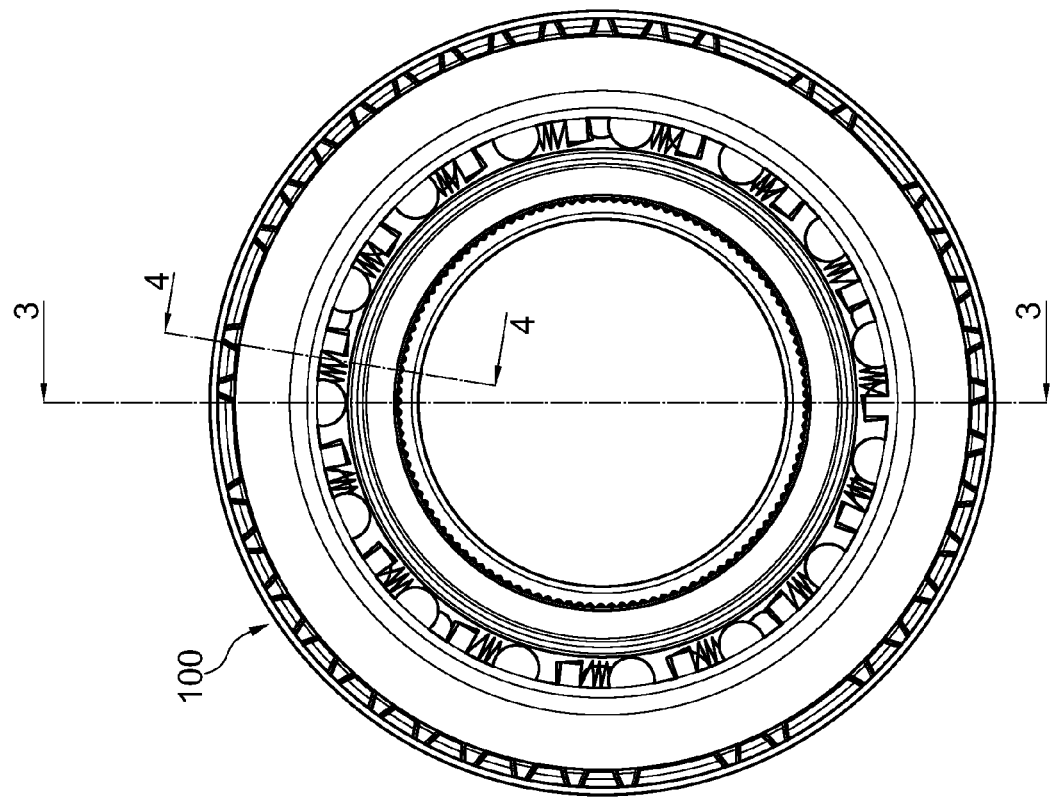
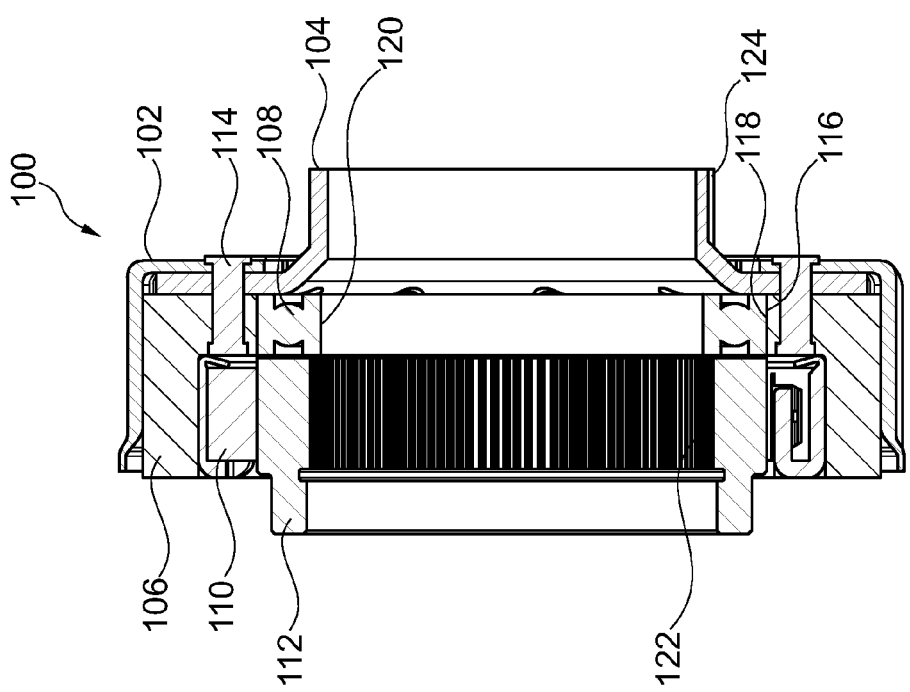

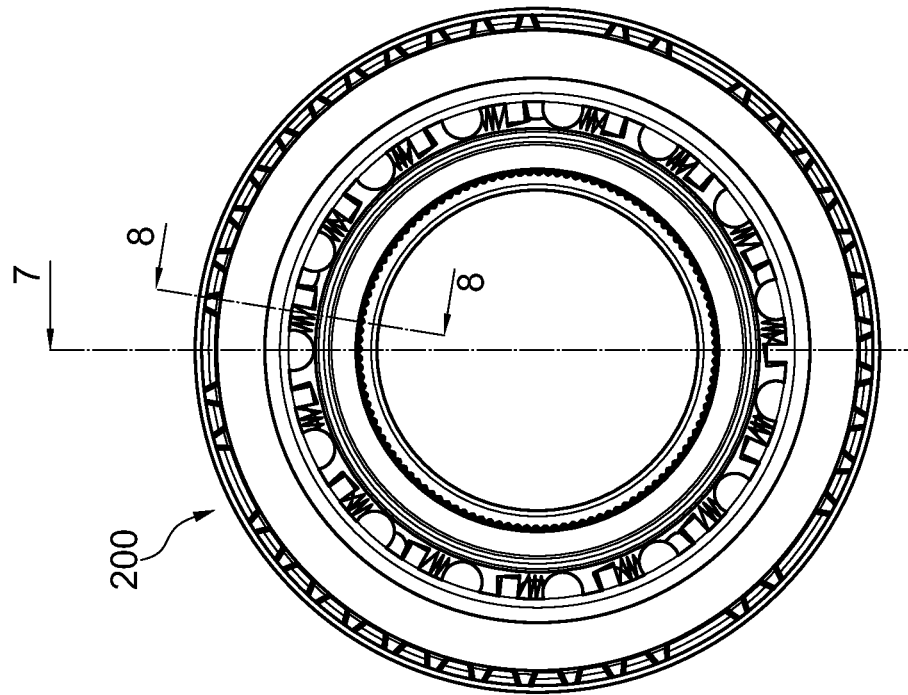
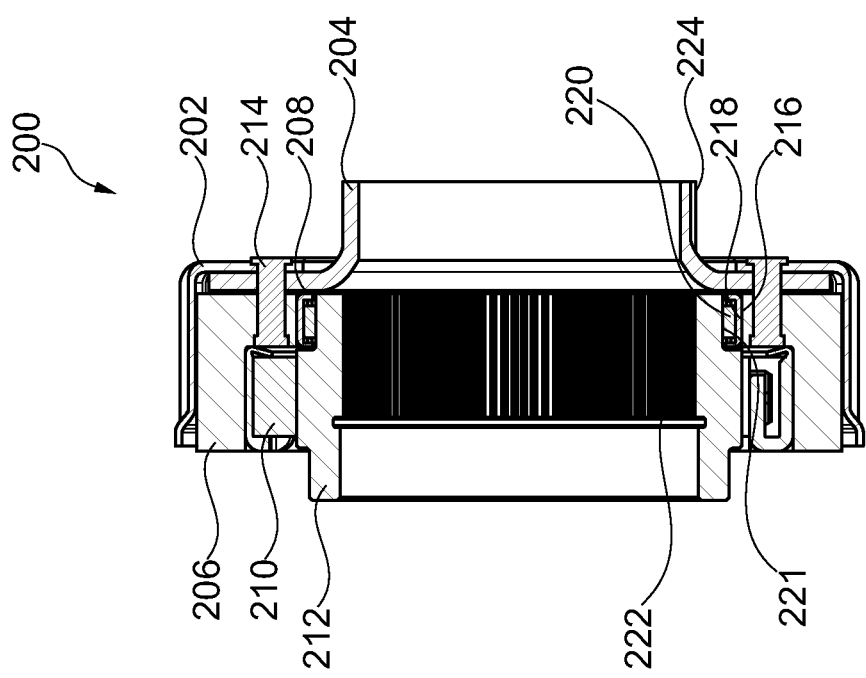
Fig. 6
Fig. 7

ONE-WAY CLUTCH CARRIER ASSEMBLY WITH BEARING

FIELD

The invention relates generally to a one-way clutch integrated into a transmission carrier, and more specifically to a one-way clutch carrier assembly with a bearing.

BACKGROUND

Clutch carrier assemblies are known from commonly assigned pending U.S. provisional patent application Ser. No. 61/771,626 filed on Mar. 1, 2013, hereby incorporated by reference as if fully set forth herein.

BRIEF SUMMARY

Example aspects broadly comprise a clutch carrier assembly for a transmission including a clutch carrier, an outer race, a bearing, an inner race, and a one-way clutch. The clutch carrier is arranged for driving engagement with a plurality of clutch plates. The outer race is fixedly connected to the carrier and has an inner circumferential surface. The bearing has an outer circumferential surface aligned with the inner circumferential surface. The inner race is arranged for driving engagement with a transmission shaft. The one-way clutch is disposed radially between the outer race and the inner race.

In some example embodiments, the clutch carrier assembly includes a hub fixedly connected to and disposed axially between the clutch carrier and outer race. In some example embodiments, the outer race includes a radial groove disposed axially between the outer race and the hub. In some example embodiments, the hub includes a radial groove or slot disposed axially between the hub and the bearing. In an example embodiment, the bearing is a ball bearing.

In some example embodiments, the clutch carrier assembly includes a thrust washer fixedly connected to and disposed axially between the hub and the outer race. In some example embodiments, the thrust washer includes a radial slot disposed axially between the hub and the bearing. In an example embodiment, the bearing is a roller bearing. In an example embodiment, the bearing includes an inner circumferential surface arranged for mating engagement with the transmission shaft. In an example embodiment, the bearing includes a roller riding on an outer circumferential surface of the inner race.

Other example aspects broadly comprise a clutch carrier assembly for a transmission including a clutch carrier, an outer race, and a one-way clutch. The clutch carrier includes an undulating outer ring and a radial wall. The outer race includes an outer portion with an undulating outer surface matingly engaged with the carrier outer ring, and an inner circumferential surface. The outer race also includes a radial wall fixed to the carrier radial wall and an inner circumferential surface. The one-way clutch assembly is installed within the outer portion inner circumferential surface and is axially aligned with the outer portion radial wall. In some example embodiments, the clutch carrier assembly has a hub fixed to the clutch carrier and the outer race. The hub includes a radial wall disposed axially between the clutch carrier and the outer race. In an example embodiment, the hub, the clutch carrier and the outer race are fixed together by riveting. In some example embodiments, the clutch carrier assembly has an inner race with an outer circumferential surface installed within the one-way clutch assembly. In an example embodiment, the clutch carrier assembly has a bearing installed within the outer race radial wall inner circumferential surface and axially aligned with the inner race.

BRIEF DESCRIPTION OF THE DRAWINGS

The nature and mode of operation of the present invention will now be more fully described in the following detailed description taken with the accompanying drawing figures, in which:

FIG. 2 is a front view of a one-way clutch carrier with bearing according to an example aspect;

FIG. 3 is a section view of the one-way clutch carrier with bearing of FIG. 2 taken generally along line 3-3 in FIG. 2;

FIG. 6 is a front view of a one-way clutch carrier with bearing according to an example aspect;

FIG. 7 is a section view of the one-way clutch carrier with bearing of FIG. 6 taken generally along line 7-7 in FIG. 6;

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
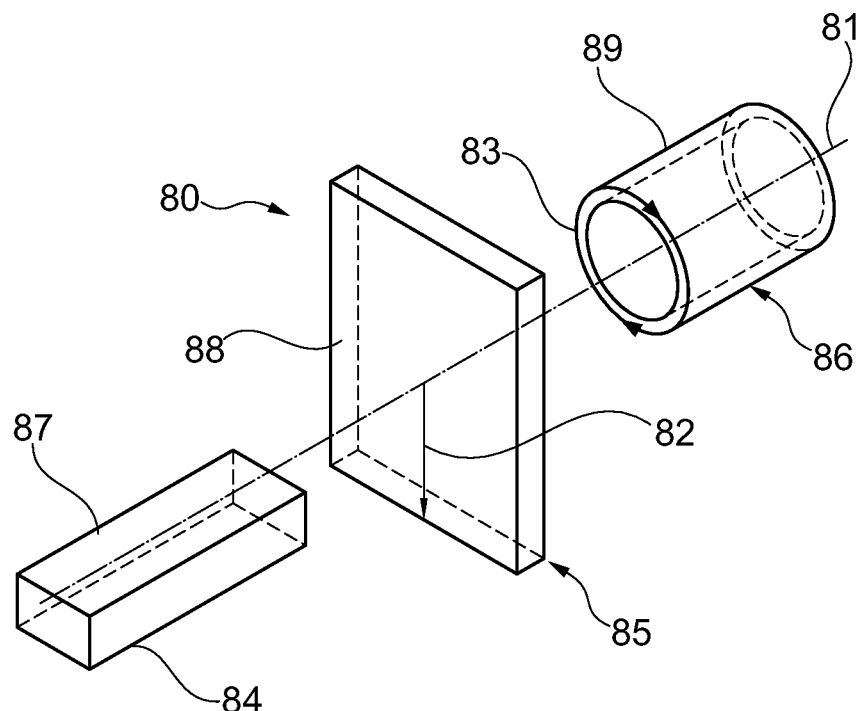
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
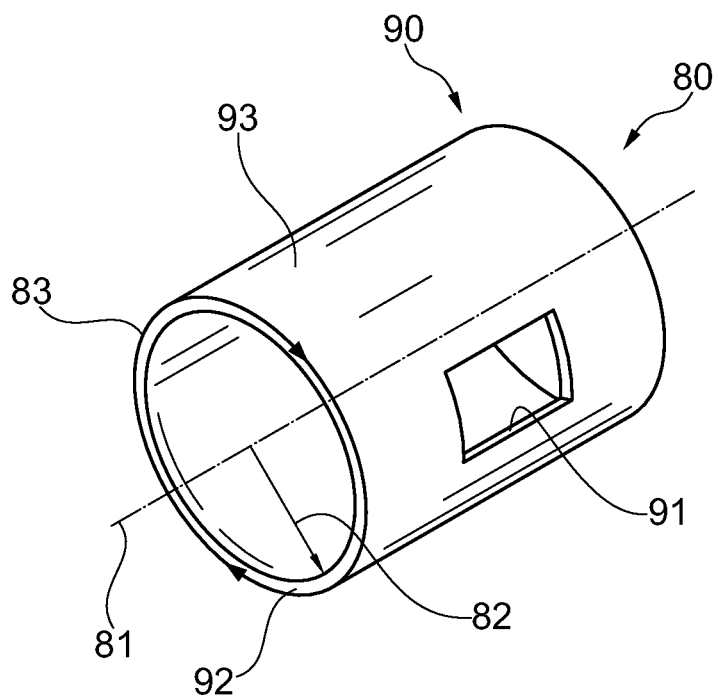
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 4:
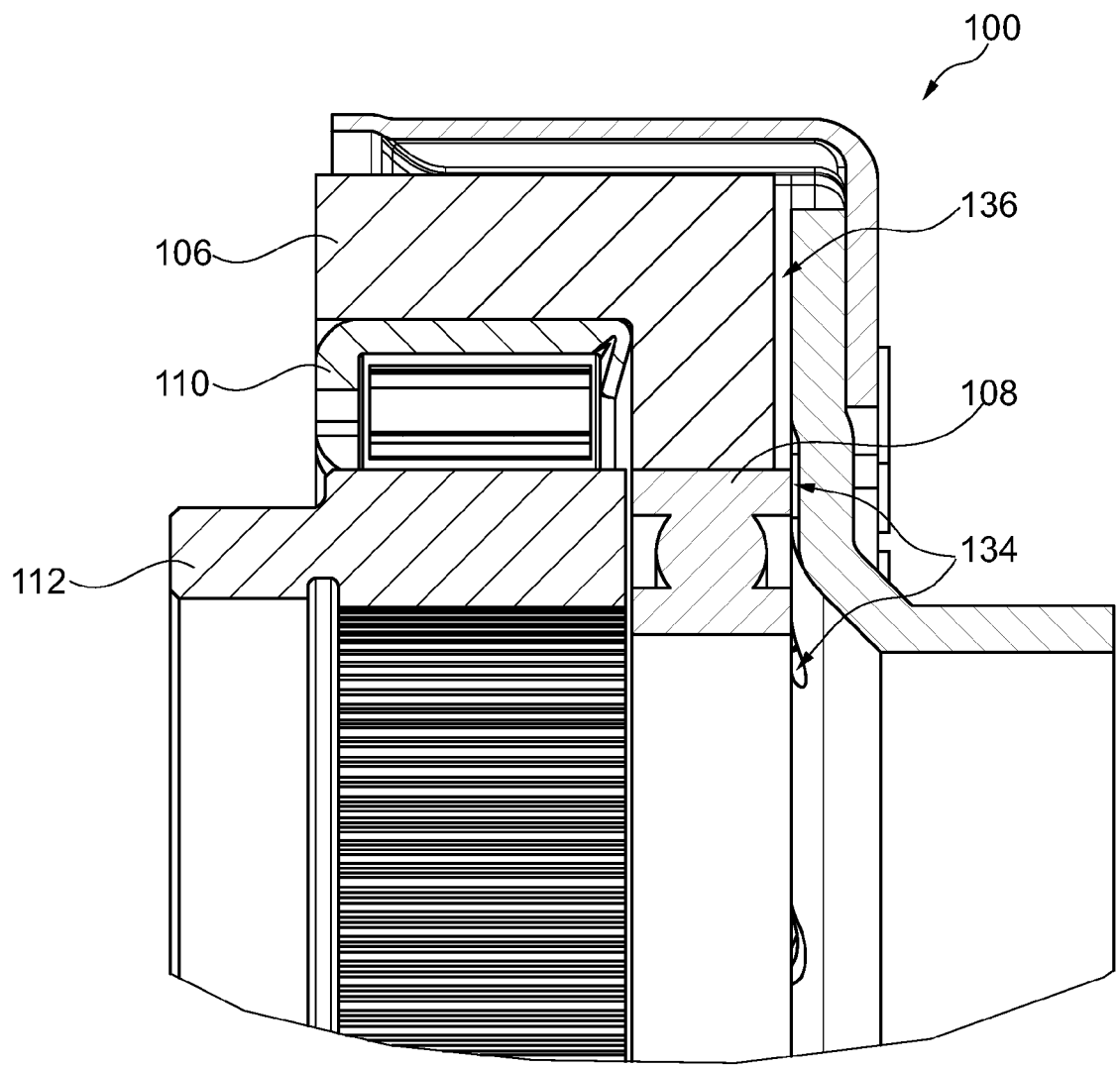
FIG. 4 is a section view of the one-way clutch carrier with bearing of FIG. 2 taken generally along line 4-4 in FIG. 2.
Figure 5:
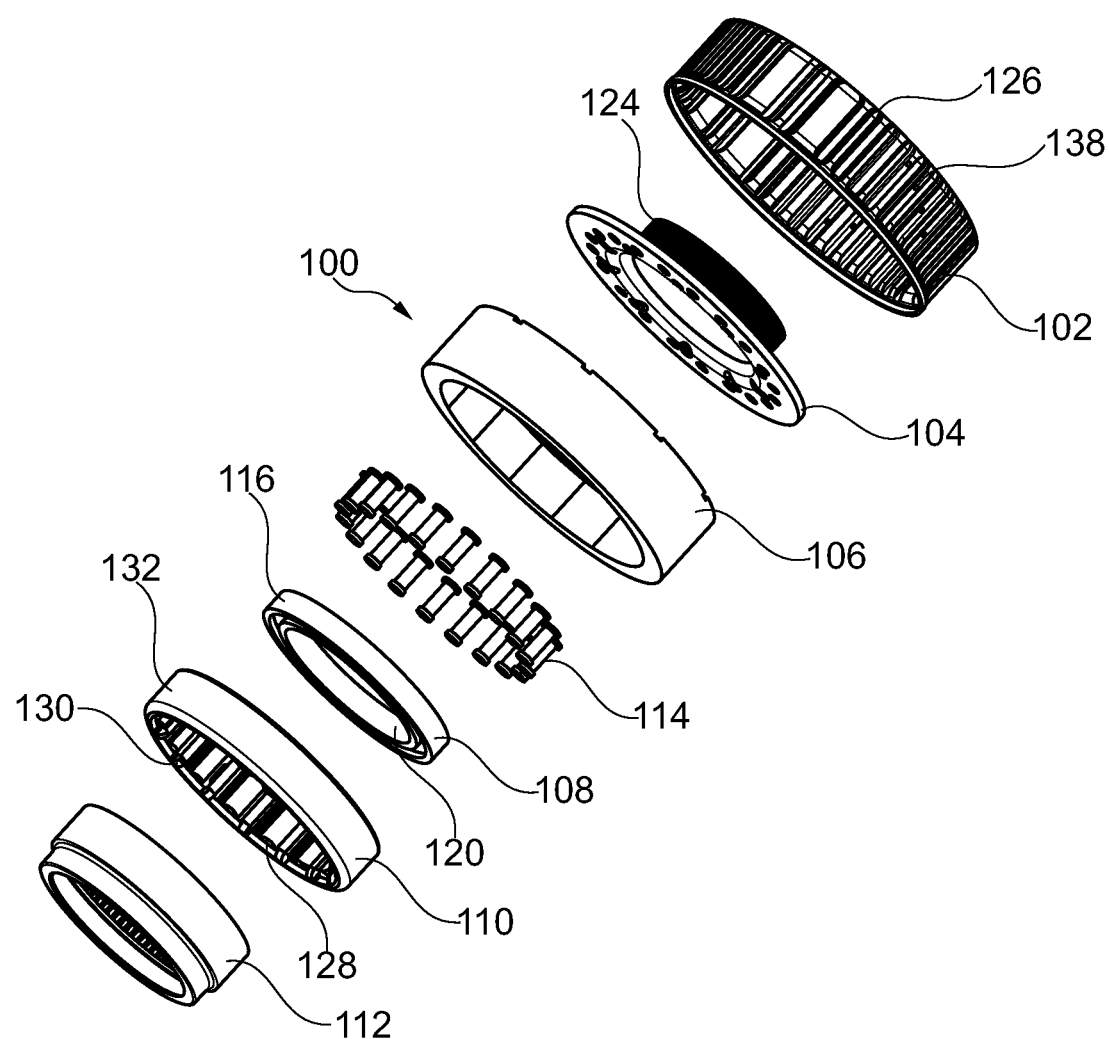
FIG. 5 is a perspective exploded view of the one-way clutch carrier with bearing of FIG. 2.

The following description is made with reference to FIGS. 2-5. FIG. 2 is a front view of one-way clutch carrier with bearing 100 according to an example aspect. FIG. 3 is a section view of one-way clutch carrier with bearing 100 of FIG. 2 taken generally along line 3-3 in FIG. 2. FIG. 4 is a section view of one-way clutch carrier with bearing 100 of FIG. 2 taken generally along line 4-4 in FIG. 2. FIG. 5 is a perspective exploded view of one-way clutch carrier with bearing 100 of FIG. 2.

Assembly 100 includes carrier 102, hub 104, outer race 106, bearing 108, one-way clutch assembly 110, and inner race 112. In an example embodiment, bearing 108 is a ball bearing capable of carrying radial and axial loads. Carrier 102, hub 104, and outer race 106 are fixedly attached by rivets 114. Rivets 114 are countersunk within race 106 for proper positioning of one-way clutch assembly 110. Assembly 110 is press-fitted into outer race 106. Bearing 108 includes outer circumferential surface 116 aligned with inner circumferential surface 118 of outer race 106, and inner circumferential surface 120 for radial alignment with a transmission shaft (not shown). In other words, the pairs of surfaces are matingly engaged. Inner race 112 includes inner spline 122 for driving engagement with the shaft. Hub 104 includes outer spline 124 for driving engagement with a transmission component such as a gear (not shown), for example.

Carrier 102 includes outwardly facing circumferential undulations 126 for driving engagement with a plurality of clutch plates (not shown). In an example embodiment, outer race 106 and inner race 112 are produced using a powdered metal process. In an example embodiment, inner race 112 is produced using a powdered metal forging process. In an example embodiment, one-way clutch assembly 110 is a cartridge-style roller clutch with rollers 128, springs 130, and ramped outer ring cage 132. Outer ring 132 is radially supported by the press-fit connection with outer race 106. That is, although ring 132 is relatively thin in the radial direction, it is supported by a radially thick outer race so that, when the clutch is engaged and the rollers are pressing outward against the ring, the load is shared by the two components.

As best seen in FIG. 4, bearing 108 provides radial positioning of outer race 106 relative to the transmission shaft (not shown). As stated above, bearing 108 and inner race 112 are both installed on the same transmission shaft. This limits a radial tolerance between the inner and outer races, improving operation of the one-way clutch and limiting drag when the inner and outer races rotate relative to one another. Hub 104 includes radially extending slots or grooves 134 for lubrication of bearing 108 and one-way clutch 110. That is, grooves 134 allow a fluid flow between hub 112 and bearing 108, and hub 104. Grooves 134 may be formed by coining in a stamping press, for example. Race 106 includes radial grooves 136, connected to grooves 134, and carrier 102 includes slots 138 (see FIG. 5), for providing lubrication and cooling flow to the clutch plates (not shown).

Figure 8:
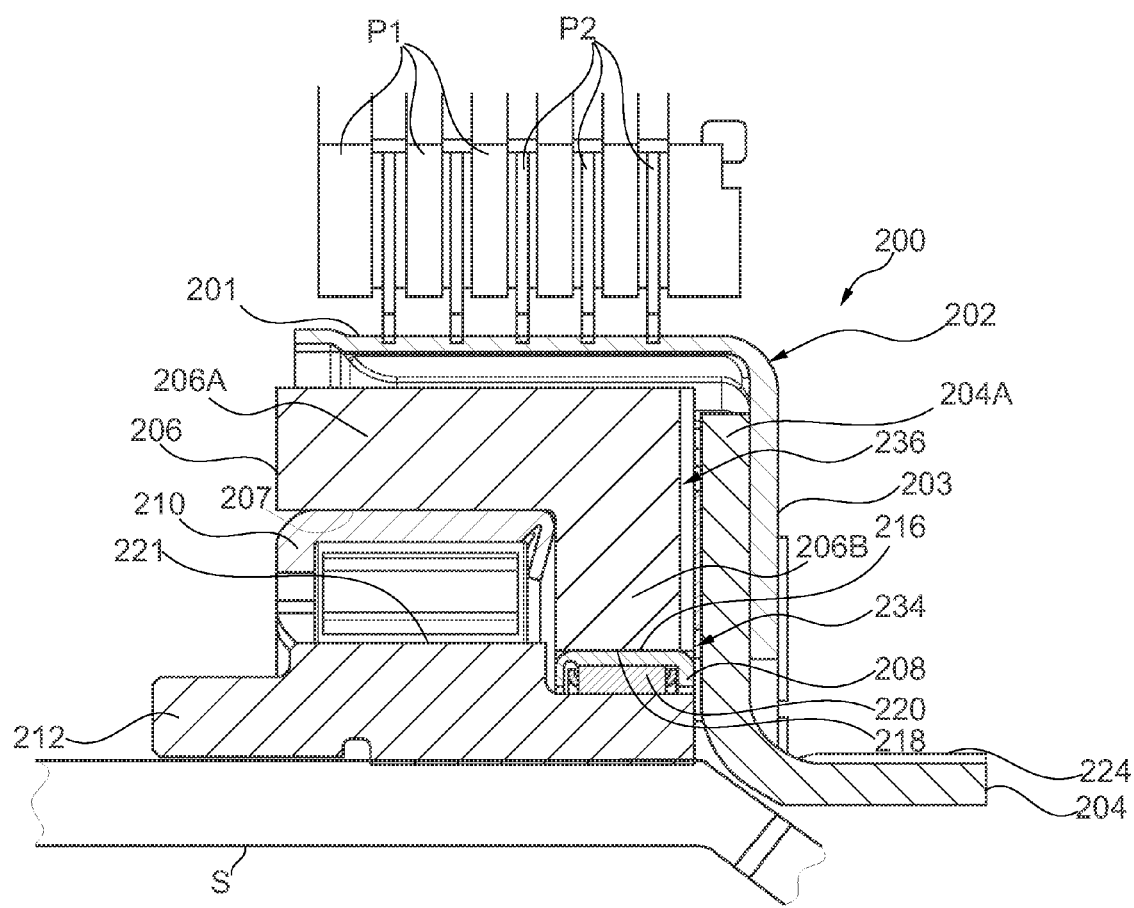
FIG. 8 is a section view of the one-way clutch carrier with bearing of FIG. 6 taken generally along line 8-8 in FIG. 6; and, FIG. 9 is a perspective exploded view of the one-way clutch carrier with bearing of FIG. 6.
Figure 9:
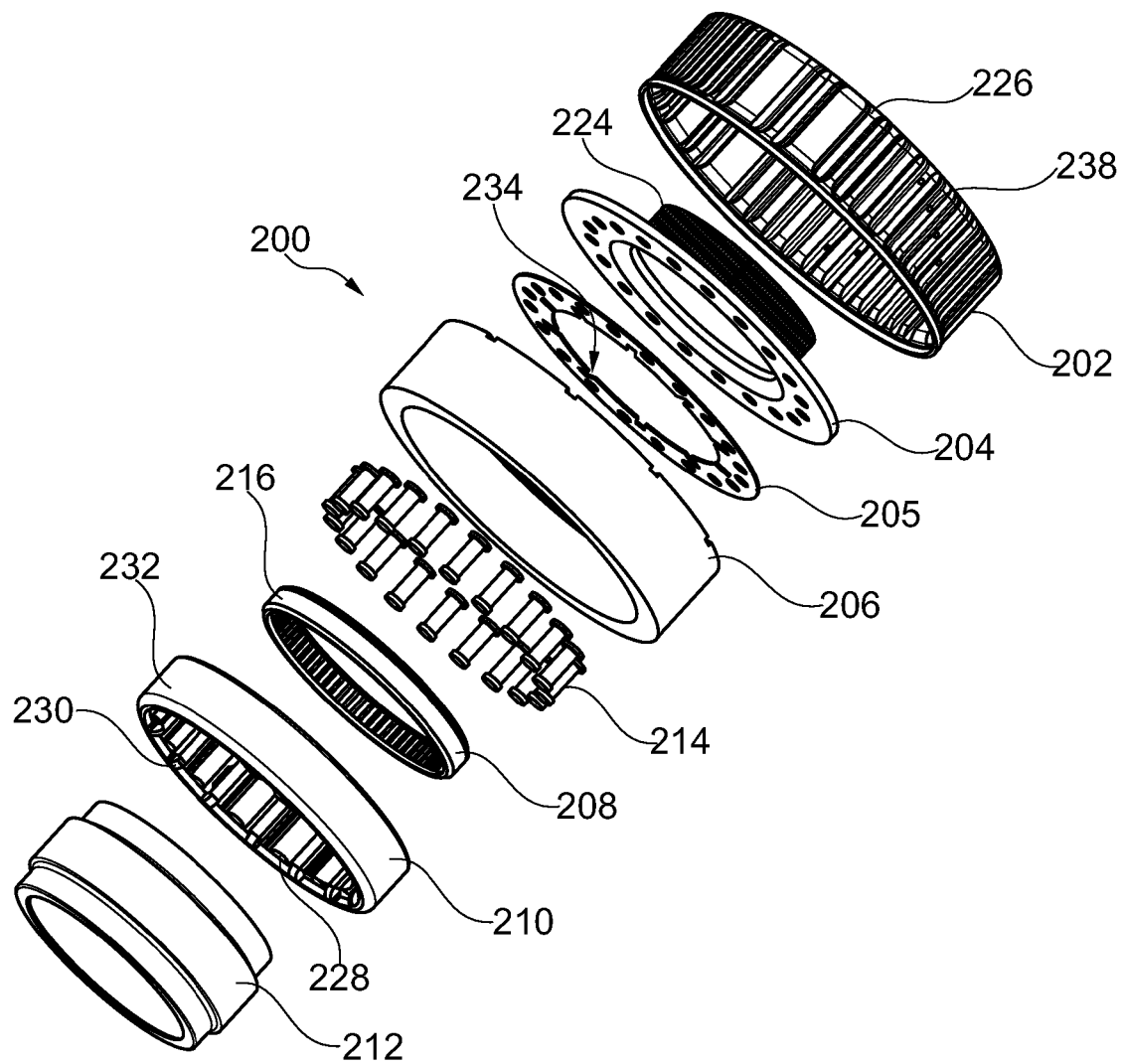

The following description is made with reference to FIGS. 6-9. FIG. 6 is a front view of one-way clutch carrier with bearing 200 according to an example aspect. FIG. 7 is a section view of one-way clutch carrier with bearing 200 of FIG. 6 taken generally along line 7-7 in FIG. 6. FIG. 8 is a section view of one-way clutch carrier with bearing 200 of FIG. 6 taken generally along line 8-8 in FIG. 6. FIG. 9 is a perspective exploded view of one-way clutch carrier with bearing 200 of FIG. 6.

Assembly 200 includes carrier 202, hub 204, thrust washer 205, outer race 206, bearing 208, one-way clutch assembly 210, and inner race 212. In an example embodiment, bearing 208 is a roller bearing capable of carrying radial loads and thrust washer 205 carries axial loads between the outer race and the hub. Carrier 202, hub 204, washer 205, and outer race 206 are fixedly attached by rivets 214. Rivets 214 are countersunk within race 206 for proper positioning of one-way clutch assembly 210. Assembly 210 is press-fitted into outer race 206. Bearing 208 includes outer circumferential surface 216 aligned with, or matingly engaged with, inner circumferential surface 218 of outer race 206, and roller 220 riding on inner race outer circumferential surface 221. Inner race 212 includes inner spline 222 for driving engagement with a transmission shaft (not shown). Hub 204 includes outer spline 224 for driving engagement with a transmission component such as a gear (not shown), for example.

Carrier 202 includes outwardly facing circumferential undulations 226 for driving engagement with a plurality of clutch plates (not shown). In an example embodiment, outer race 206 and inner race 212 are produced using a powdered metal process. In an example embodiment, inner race 212 is produced using a powdered metal forging process. In an example embodiment, one-way clutch assembly 210 is a cartridge-style roller clutch with rollers 228, springs 230, and ramped outer ring cage 232. Outer ring 232 is radially supported by the press-fit connection with outer race 206. That is, although ring 232 is relatively thin in the radial direction, it is supported by a radially thick outer race so that, when the clutch is engaged and the rollers are pressing outward against the ring, the load is shared by the two components.

As best seen in FIG. 8, bearing 208 provides radial positioning of outer race 206 relative to inner race 212. This limits a radial tolerance between the inner and outer races, improving operation of the one-way clutch and limiting drag when the inner and outer races rotate relative to one another. Washer 205 includes radially extending slots or grooves 234 for lubrication of bearing 208 and one-way clutch 210. That is, slots 234 allow a fluid flow between race 212 and bearing 208, and hub 204. Race 206 includes radial grooves 236, connected to slots 234, and carrier 202 includes slots 238 (see FIG. 9), for providing lubrication and cooling flow to the clutch plates P1 and P2. FIG. 8 also shows transmission shaft S and outer spline 224.

As best seen in FIGS. 8 and 9, clutch carrier assembly 200 includes clutch carrier 202 including undulating outer ring 201 and radial wall 203. Outer race 206 includes outer portion 206A having inner circumferential surface 207. Outer race 206 also includes radial wall portion 206B having inner circumferential surface 218; radial wall portion 206B is fixed to carrier radial wall 203. One-way clutch assembly 210 is installed within outer portion inner circumferential surface 207 and is axially aligned with outer race radial wall portion 206B. In some example embodiments, clutch carrier assembly 200 has hub 204 fixed to clutch carrier 202 and outer race 206. Hub 204 includes radial wall 204A disposed axially between clutch carrier radial wall 203 and outer race radial wall portion 206B. In an example embodiment, hub 204, clutch carrier 202, and outer race 206 are fixed together by riveting. In some example embodiments, clutch carrier assembly 200 has inner race 212 with outer circumferential surface 221 installed within one-way clutch assembly 210. In an example embodiment, clutch carrier assembly 200 has bearing 208 installed within outer race radial wall portion inner circumferential surface 218 and axially aligned with inner race 212.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A clutch carrier assembly for a transmission comprising:
   a clutch carrier arranged for driving engagement with a plurality of clutch plates and including a radial wall;
   an outer race including an outer portion having a first inner circumferential surface and a radial wall portion fixed to the carrier radial wall and having a second inner circumferential surface;
   a hub including an outer spline and fixedly connected to and disposed axially between the clutch carrier and the outer race;
   a bearing including an outer circumferential surface aligned with the outer race inner circumferential surface;
   an inner race arranged for driving engagement with a transmission shaft; and,
   a one-way clutch disposed radially between the outer race and the inner race.

2. The clutch carrier assembly of claim 1 wherein the outer race includes a radial groove disposed axially between the outer race and the hub.

3. The clutch carrier assembly of claim 2 wherein the hub includes a radial groove or slot disposed axially between the hub and the bearing.

4. The clutch carrier assembly of claim 3 wherein the bearing is a ball bearing.

5. The clutch carrier of claim 2 further comprising a thrust washer fixedly connected to and disposed axially between the hub and the outer race.

6. The clutch carrier of claim 5 wherein the thrust washer includes a radial slot disposed axially between the hub and the bearing.

7. The clutch carrier assembly of claim 6 wherein the bearing is a roller bearing.

8. The clutch carrier assembly of claim 1 wherein the bearing includes an inner circumferential surface arranged for mating engagement with the transmission shaft.

9. The clutch carrier assembly of claim 1 wherein the bearing includes a roller riding on an outer circumferential surface of the inner race.

10. A clutch carrier assembly for a transmission comprising:
    a clutch carrier including an undulating outer ring and a radial wall;
    an outer race including:
      an outer portion having a first inner circumferential surface; and,
      a radial wall portion fixed to the carrier radial wall and having a second inner circumferential surface;
    a hub including an outer spline and fixedly connected to and disposed axially between the clutch carrier and the outer race; and,
    a one-way clutch assembly installed within the outer portion first inner circumferential surface and axially aligned with the outer race radial wall portion.

11. The clutch carrier assembly of claim 10 wherein the hub includes a radial wall disposed axially between the clutch carrier and the outer race.

12. The clutch carrier assembly of claim 11 wherein the hub, the clutch carrier and the outer race are fixed together by riveting.

13. The clutch carrier assembly of claim 10 further comprising an inner race including an outer circumferential surface installed within the one-way clutch assembly.

14. The clutch carrier assembly of claim 13 further comprising a bearing installed within the outer race radial wall portion inner circumferential surface and axially aligned with the inner race.

* * * * *